(12) United States Patent
Lee et al.

(10) Patent No.: US 7,458,446 B1
(45) Date of Patent: Dec. 2, 2008

(54) PARKING BRAKE FOR VEHICLE USING INNER AIR EXHAUSTION TYPE BALL-IN-RAMP BRAKE CALIPER

(75) Inventors: Kangkuk Lee, Gyeongbuk (KR); Munhwan Byoun, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/933,567

(22) Filed: Nov. 1, 2007

(30) Foreign Application Priority Data

Aug. 31, 2007 (KR) ...................... 10-2007-0088063

(51) Int. Cl.
*F16D 55/16* (2006.01)
(52) U.S. Cl. .................................................... 188/72.8
(58) Field of Classification Search ................. 188/2 D, 188/71.8–71.9, 72.7–72.9
See application file for complete search history.

(56) References Cited

U.S. PATENT DOCUMENTS

| | | | |
|---|---|---|---|
| 4,635,761 A | 1/1987 | Smith et al. | |
| 6,811,002 B2 * | 11/2004 | Nakayama et al. | 188/71.9 |
| 6,860,570 B2 * | 3/2005 | Yanaka et al. | 303/20 |
| 6,988,596 B2 * | 1/2006 | Gerard et al. | 188/72.8 |
| 6,997,291 B2 * | 2/2006 | Boisseau | 188/106 F |
| 7,178,645 B2 * | 2/2007 | Maehara | 188/196 P |
| 2004/0245055 A1 * | 12/2004 | Gerard et al. | 188/72.6 |
| 2005/0217949 A1 * | 10/2005 | Ohta | 188/72.8 |
| 2007/0114101 A1 | 5/2007 | Elderfield | |
| 2007/0296269 A1 * | 12/2007 | Jeon | 303/20 |

FOREIGN PATENT DOCUMENTS

JP 2006 194450 7/2006

OTHER PUBLICATIONS

English language Abstract of JP 2006-194450.
U.S. Appl. No. 11/933,574 to Lee, filed Nov. 1, 2007.

* cited by examiner

*Primary Examiner*—Christopher P Schwartz
(74) *Attorney, Agent, or Firm*—Greenblum & Bernstein, P.L.C.

(57) ABSTRACT

According to the present invention, a cartridge assembly, which is inserted into an inner cylinder of a caliper housing and generates an axial force during parking braking, is fixed by a retainer outside caliper housing. Accordingly, a space occupying member for fixing is not provided in the inner cylinder of caliper housing, and for this reason, the inner cylinder can be more simply machined. Further, when air is discharged after the cartridge assembly is inserted into the caliper housing, air can smoothly flow in the inner cylinder of the caliper housing.

3 Claims, 3 Drawing Sheets

PARKING BRAKE FOR VEHICLE USING INNER AIR EXHAUSTION TYPE BALL-IN-RAMP BRAKE CALIPER

CROSS-REFERENCE TO RELATED APPLICATIONS

The present application is based on, and claims priority from, Korean Application Serial Number 10-2007-0088063, filed on Aug. 31, 2007, the disclosure of which is hereby incorporated by reference herein in its entirety.

FIELD OF THE INVENTION

The present invention relates to a parking brake for a vehicle, and more particularly, to a parking brake for a vehicle that uses an inner air exhaustion type Ball-in-Ramp brake caliper.

BACKGROUND OF THE INVENTION

In general, a parking brake, which is used to temporarily park a vehicle or park a vehicle on an inclined place such as a hill, applies pressure to a wheel by using cables pulled by a hand unlike a brake that applies pressure to a wheel by using oil pressure generated by a general pedal. The parking brake is operated by a parking lever provided near a driver's seat.

The parking brake includes a parking lever, a parking brake cable, and an equalizer. The parking lever is operated by a hand. The parking brake cables are pulled or loosened by a latch assembly (not shown) operated by a release knob, which is provided in the lever and releases the brake. The equalizer is provided between left and right cables connected to left and right rear wheels, and uniformly distributes an operation force.

The above-mentioned parking brake is generally locked by a strong contact force generated by pressing pads against a drum, which is provided in the wheel, with an operation force of the parking brake.

Further, a manner using a caliper for performing braking with a disk-plate positioned between pads is also used instead of a manner pressing the pads against the drum. The caliper, which forms the parking brake and applies a braking force to the disk-plate, is generally called a BIR caliper (Ball-In-Ramp Caliper).

As a parking brake using the BIR caliper is operated, an axial force is generated in the BIR caliper by a parking cable. That is, when a pulling force of the parking cable is changed into torque due to a ramp and the positions of the balls provided in the BIR caliper are changed, an increased axial force is generated at an opposite ramp due to the movement of the balls and pads are pressed against the disk-plate due to the axial force. As a result, a parking braking force is generated.

Since the BIR caliper generates a braking force by using pressure of oil that is supplied to the caliper during main braking, assembling should be performed so that air does not remain in a pressure chamber (in general, called a cylinder) of the caliper in which a BIR type (Ball-In-Ramp) cartridge assembly is received.

For this reason, after each of components is assembled, the cartridge assembly is generally assembled in the liquid pressure chamber of the caliper in order to improve assembling workability.

Further, after the cartridge assembly is assembled, air is exhausted from the liquid pressure chamber of the caliper to prevent a brake pedal feeling from deteriorating during braking, and to prevent the liquid pressure of left and right rear wheels from being different from each other.

However, if air is exhausted after the cartridge assembly and the caliper are completely assembled with each other, it is difficult to completely exhaust inner air due to a structure that prevents the cartridge assembly from freely moving in the inner cylinder.

The reason for this is as follows: since the cartridge assembly is complicated and the cartridge assembly is fixed using a separate fixing member in the liquid pressure chamber of the caliper, a protruding portion obstructs the flow of air to be discharged to the outside during the air exhaustion. Accordingly, air may remain in the caliper.

If air remains in the caliper, brake pedal operation feeling deteriorates during braking and difference may occur in the increase of the liquid pressure between the left and right rear wheels.

In addition, since the cartridge assembly is fixed using a separate fixing member in the liquid pressure chamber of the caliper, that is, the inserted cartridge assembly is fixed in the liquid pressure chamber of the caliper, it is difficult to insert the cartridge assembly into the liquid pressure chamber of the caliper.

SUMMARY OF THE INVENTION

Embodiments of the present invention provide a parking brake for a vehicle that uses an inner air exhaustion type Ball-in-Ramp brake caliper. In the parking brake, a cartridge assembly inserted into a liquid pressure chamber of a caliper is fixed by using a portion, which is exposed to the outside of the caliper, of a BIR type (Ball-In-Ramp Type) cartridge assembly inserted into the caliper that includes a liquid pressure chamber filled with brake oil. Accordingly, it is possible to easily insert the cartridge assembly into the caliper.

Further, according to embodiments of the present invention, since a cartridge assembly is fixed outside a caliper, such that a separate protruding member occupying the space of a chamber is not provided in a liquid pressure chamber of the caliper, air exhaustion is performed without air remaining in the caliper because the inner space is occupied in the liquid pressure chamber of the caliper. Accordingly, embodiments of the present invention prevent the deterioration of brake pedal operation feeling and difference occurring in the increase of the liquid pressure between the left and right rear wheels, which is due to air remaining in the caliper.

Furthermore, since a cartridge assembly is fixed outside of a caliper, grooves do not need to be formed in a liquid pressure chamber of a caliper. Accordingly, embodiments of the present invention simplify a process for machining a caliper.

According to an embodiment of the present invention, a parking brake for a vehicle using an inner air exhaustion type Ball-in-Ramp brake caliper includes a parking unit, a caliper housing a cartridge assembly, a pad wear compensator, and a retainer. When a parking lever is operated, the parking unit generates an operation force uniformly pulling a parking cable by an equalizer. The caliper housing covers both surfaces of a disk-plate provided in a wheel and includes an inner cylinder filled with brake oil and pads. The inner cylinder includes a liquid pressure chamber, a BIR chamber, and an entrance chamber. The BIR chamber is formed at a front portion of the liquid pressure chamber and has a diameter smaller than the liquid pressure chamber. The entrance chamber is formed at a front portion of the BIR chamber and has a diameter smaller than the BIR chamber. Grooves are not formed on inner surfaces of the liquid pressure chamber and the BIR chamber. The entrance chamber is formed through a retainer fixing end protruding from the caliper housing. The cartridge assembly includes balls and an output ramp. The balls are provided in grooves formed on an input ramp provided in the BIR chamber of the caliper housing. The output ramp is provided close to the liquid pressure chamber at a side opposite to the input ramp to form the grooves so that the balls are provided in the grooves. A parking operation force input unit connected to the parking cables is fixed outside the caliper housing. The cartridge assembly changes a pulling force of the parking cable into torque and an axial force during parking braking. The pad wear compensator is connected to the output ramp. When the output ramp moves in an axial direction, the pad wear compensator is provided in the liquid pressure chamber of the caliper housing so as to press the pads against both surfaces of the disk-plate. The retainer is fixed to a rod of the input ramp so as to restrict free movement of the cartridge assembly assembled in the inner cylinder of the caliper housing and the pad wear compensator. The rod of the input ramp is fixed to the parking operation force input unit and protrudes to the outside of the caliper housing.

According to the present invention, the cartridge assembly is fixed not in the liquid pressure chamber of the caliper but outside the caliper. Accordingly, a process for machining the caliper does not need to be performed in the liquid pressure chamber of the caliper, and a separate member does not occupy the space in the caliper. For this reason, inner air is completely exhausted. As a result, it is possible to prevent the deterioration of characteristics, such as the deterioration of brake pedal operation feeling and difference occurring in the increase of the liquid pressure between the left and right rear wheels, which are caused by air remaining in the caliper.

Further, according to the embodiment of the present invention, the cartridge assembly inserted into the liquid pressure chamber of the caliper is fixed by using a portion thereof exposed to the outside of the caliper. For this reason, it is possible to more easily assemble the cartridge assembly as compared to when a cartridge assembly is fixed in a liquid pressure chamber of a caliper.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

A preferred embodiment of the present invention will be described in detail below with reference to the accompanying drawings. Since the embodiment may be modified in various ways by those skilled in the art, the present invention is not limited to the embodiment.

Figure 1:
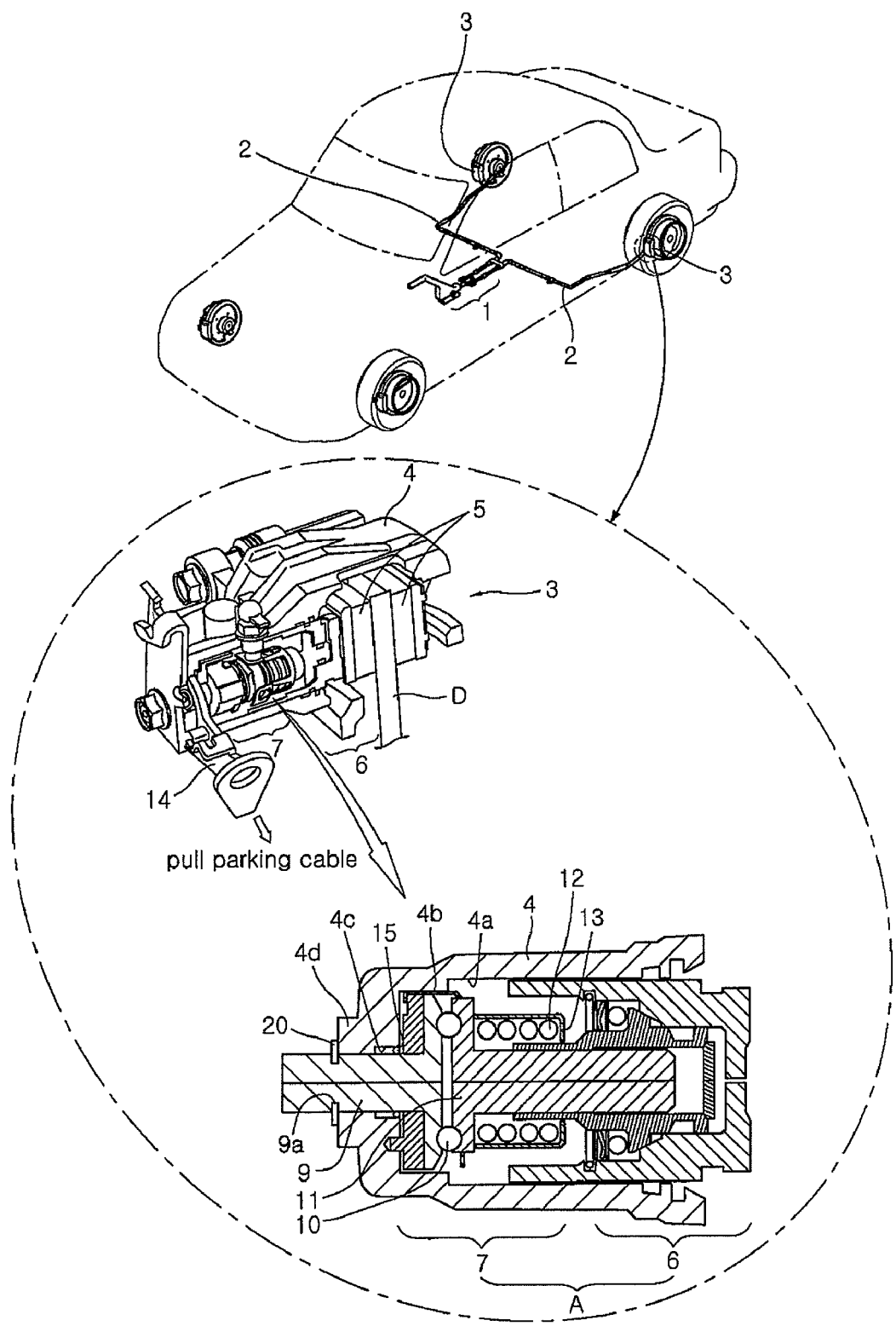
FIG. 1 is a view showing the structure of a parking brake for a vehicle, which uses an inner air exhaustion type Ball-in-Ramp brake caliper, according to an embodiment of the present invention.

FIG. 1 is a view showing the structure of a parking brake for a vehicle, which uses an inner air exhaustion type Ball-in-Ramp brake caliper, according to an embodiment of the present invention. The parking brake according to the embodiment of the present invention includes a parking unit 1 and caliper 3. Parking unit 1 is provided in a cabin of a vehicle and used to pull parking cables 2 connected to wheels. Caliper 3 generates a parking braking force using an axial force that is generated while being rotated due to a pulling force applied by parking unit 1, and presses pads 5 against a disk-plate D so that a braking force is generated by the pressure of brake oil during braking.

Further, a parking lever of parking unit 1 that is operated by a driver is provided in a cabin of a vehicle. The parking lever is connected to caliper 3 by parking cables 2 so that caliper 3 mounted on disk-plate D provided in each of the wheels is operated by a pulling force applied by the parking lever. An equalizer, which allows the operation force of the parking lever to be uniformly applied to left and right wheels, is provided on parking cables 2.

In addition, caliper 3 includes a caliper housing 4 and a pair of pads 5. The caliper housing is provided to cover both surfaces of disk-plate D provided in each of the wheels, and has a liquid pressure chamber, which is filled with brake oil, therein. The pair of pads 5 is provided in caliper housing 4 so as to move in a side direction of disk-plate D.

Further, a parking force generator A is provided in the liquid pressure chamber of caliper housing 4 so as to generate an axial force that presses pads 5 against disk-plate D during braking.

Parking force generator A includes a cartridge assembly 7 and a pad wear compensator 6. While being rotated by a parking operation force input unit 14 that is connected to parking cable 2 outside caliper housing 4, cartridge assembly 7 moves in an axial direction. Pad wear compensator 6 presses pads 5 against disk-plate D due to the axial force applied by cartridge assembly 7.

Further, one end of parking operation force input unit 14 is connected to parking cable 2. Accordingly, when parking cable 2 is pulled, an element connected to the other end of the parking operation force input unit is rotated.

In this case, the element rotated by parking operation force input unit 14 is cartridge assembly 7 protruding outside caliper housing 4.

Further, an inner cylinder of caliper housing 4 is different from that of a caliper used in a general caliper type brake system. The reason for this is that cartridge assembly 7 is supported outside caliper housing 4 not to freely move in the inner cylinder.

Pads 5, which move toward disk-plate D, are fixed to pad wear compensator 6 of parking force generator A. The pad wear compensator pushes the pads due to the pressure of oil that is supplied to the inner cylinder of caliper housing 4 during braking, or pushes pads 5 due to the axial force during parking braking. The pad wear compensator has a general structure of a BIR (Ball-In-Ramp) type caliper brake.

Cartridge assembly 7 of parking force generator A has a BIR (Ball-In-Ramp) type structure that generates an axial force while rotating. When parking operation force input unit 14 is pulled by parking cable 2 and is rotated, due to torque, balls having variable movement trajectories push an element disposed at an end of the cartridge assembly opposite to the parking operation force input unit in an axial direction. As a result, while pads 5 move toward disk-plate D, a parking braking force is generated.

For this purpose, cartridge assembly 7 includes an input ramp 9, an output ramp 17, and a ball case housing 13. Input ramp 9 is rotated by parking operation force input unit 14 of which one end is connected to parking cable 2 outside caliper housing 4. Output ramp 11 is provided at a side opposite to input ramp 9, and generates an axial force pushing pads 5 toward disk-plate D when input ramp 9 is rotated. Balls 10 are provided between input and output ramps 9 and 11, and move so as to push output ramp 11 in the axial direction by the rotating input ramp 9.

In addition, cartridge assembly 7 further includes a spring 12 and a holder housing 13. When output ramp 11 having moved in the axial direction returns to an initial position during the release of the parking state, spring 12 generates an elastic force to push output ramp 11 to the initial position. Holder housing 13 is provided on output ramp 11 so as to surround spring 12, and is fixed to a spring seat of input ramp 9.

In this case, a coil spring is used as spring 12. Further, holder housing 13 is provided with one or more hooks or locking pieces having the shape of a latch, which are caught by and fixed to the spring seat of input ramp 9. The hooks or the locking pieces are formed on the holder housing at constant intervals of 120 degrees.

Further, grooves having a substantially V-shaped cross section are formed on the surfaces of which input and output ramps 9 and 11 come in contact with each other with balls 10 therebetween. When input ramp 9 is rotated, the grooves allow output ramp 11 to be pushed in the axial direction due to the diameter of each of balls 10. The above-mentioned structure has been generally used in a BIR type brake caliper.

Further, a rod protrudes from each of the surfaces of which input and output ramps 9 and 11 come in contact with each other with balls 10 interposed therebetween. The end of the rod of input ramp 9 is disposed outside caliper housing 4, but the end of the rod of output ramp 11 is disposed close to pads 5.

As described above, pad wear compensator 6 and cartridge assembly 7 are fixed outside caliper housing 4. For this purpose, the inner cylinder of caliper housing 4 has a multi-diameter structure so as to correspond to pad wear compensator 6 and cartridge assembly 7.

That is, as shown in FIG. 1, the inner cylinder of caliper housing 4 includes a liquid pressure chamber 4a, a BIR chamber 4b, and an entrance chamber 4c. Output ramp 11 is received in liquid pressure chamber 4a, and pad wear compensator 6 pressing pads 5 is inserted into the liquid pressure chamber. BIR chamber 4b has a diameter smaller than the liquid pressure chamber and is formed at the front portion of liquid pressure chamber 4a so as to receive input ramp 9, which is assembled to output ramp 11 with balls 10 interposed therebetween. Entrance chamber 4c has a diameter smaller than the BIR chamber and is formed at the front portion of BIR chamber 4b so that the rod of input ramp 9 protrudes to the outside of caliper housing 4.

In this case, liquid pressure chamber 4a, BIR chamber 4b, and entrance chamber 4c have different diameters and form a multi-diameter structure. The inner surfaces of the chambers do not have grooves and are smooth.

In addition, a retainer fixing end 4d, which protrudes from caliper housing 4, is formed at the portion of caliper housing 4, in which entrance chamber 4c is formed, so as to fix a rod 9a of input ramp 9 passing through entrance chamber 4c. Pad wear compensator 6 and cartridge assembly 7, which are inserted into the inner cylinder of caliper housing 4, are fixed by retainer fixing end 4d.

As shown in FIG. 1, rod 9a of input ramp 9 passing through retainer fixing end 4d protruding from caliper housing 4 is supported by a retainer 20, so that cartridge assembly 7 is fixed.

That is, when retainer 20 is fitted into a groove formed on rod 9a of input ramp 9, one surface of retainer 20 comes in contact with and is fixed to a surface of retainer fixing end 4d. Further, when the portion where retainer 20 is fitted is sealed, oil filled in the inner cylinder of caliper housing 4 does not leak.

In this case, the sealing at the portion where retainer 20 may be fitted is performed outside caliper housing 4. However, as shown in FIG. 1, the portion may be sealed by an O-ring 15 in the inner cylinder of caliper housing 4, or may be sealed by a separate member such as a sealing cap. The above-mentioned sealing structure is generally used in the BIR type caliper brake.

Since retainer 20 supports rod 9a of input ramp 9 outside caliper housing 4 as described above, cartridge assembly 7 does not freely move even though cartridge assembly 7 is operated in the inner cylinder of caliper housing 4 during parking braking.

Figure 2:
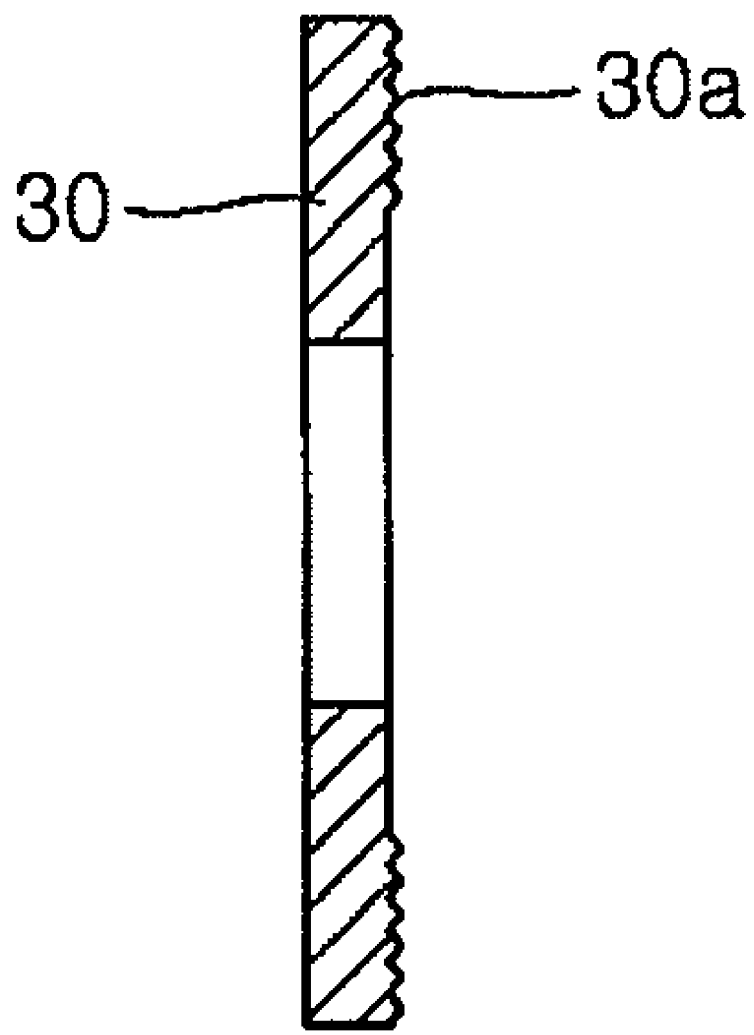
FIG. 2 is a view showing a modification of a retainer that is fixed outside a caliper housing in the embodiment of the present invention.

Further, the retainer may be modified in various ways so as to have additional functions in addition to a function for supporting input ramp 9. For example, as shown in FIG. 2, contact protrusions 30a may protrude from one surface of retainer 30.

Retainer 30 supports rod 9a of input ramp 9 during the assembly. Further, since contact protrusions 30a penetrate the surface of retainer fixing end 4d protruding from caliper housing 4, it is possible to obtain a more reliable fitting force.

According to the present invention, cartridge assembly 7, which is inserted into the inner cylinder of caliper housing 4 and generates an axial force during parking braking, is fixed by retainer 20 outside caliper housing 4. Accordingly, a space occupying member B for fixing is not provided in the inner cylinder of caliper housing 4. For this reason, the inner cylinder can be machined using a simplified process. Further, when air is discharged after cartridge assembly 7 is inserted into caliper housing 4, air can smoothly flow in the inner cylinder of caliper housing 4.

The above-mentioned characteristics are obtained by a combination structure between the caliper that is provided on disk-plate D and cartridge assembly 7 that is inserted into the inner cylinder of the caliper. That is, grooves are not formed on the inner surface of the inner cylinder of caliper housing 4. Further, cartridge assembly 7, which is inserted into the inner cylinder of caliper housing 4 and generates an axial parking braking force, and pad wear compensator 6 are fixed by retainer 20 outside caliper housing 4. Therefore, it is possible to obtain the above-mentioned characteristics.

That is, as shown in FIG. 1, grooves are not formed on the inner surface of liquid pressure chamber 4a in the inner cylinder of caliper housing 4. Further, grooves are not formed on the inner surface of BIR chamber 4b, which is formed at the front portion of liquid pressure chamber 4a and has a diameter smaller than the liquid pressure chamber. Furthermore, entrance chamber 4c, which is formed at the front portion of BIR chamber 4b has a diameter smaller than the BIR chamber, is formed through retainer fixing end 4d protruding from caliper housing 4.

In addition, cartridge assembly 7 includes input ramp 9, balls 10, and output ramp 11, which generate braking torque and an axial force during parking. Pad wear compensator 6 presses pads 5 against disk-plate D by the axial force generated from cartridge assembly 7. Cartridge assembly 7 is combined with pad wear compensator 6, that is, the cartridge assembly and the pad wear compensator form parking force generator A. Then, the cartridge assembly combined with the pad wear compensator is inserted into the inner cylinder of caliper housing 4, and the cartridge assembly is then fixed by retainer 20 outside caliper housing 4.

In this case, retainer 20 supports input ramp 9, which is connected to parking operation force input unit 14 so as to be rotated by the operation force of parking cables 2. That is, the retainer is fixed outside caliper housing 4 by using rod 9a of input ramp 9, which forms an opposite end of a part combined with balls 10 provided in BIR chamber 4b of caliper housing 4 and protrudes from retainer fixing end 4d of caliper housing 4 through entrance chamber 4c. Accordingly, cartridge assembly 7 inserted into the inner cylinder of caliper housing 4 is assembled without freely moving.

When retainer 20 is fitted into the groove formed on rod 9a of input ramp 9, one surface of retainer 20 comes in contact with and is fixed to a surface of retainer fixing end 4d. Further, when O-ring 15 is provided at entrance chamber 4c or the portion where retainer 20 is fitted is sealed, oil filled in the inner cylinder of caliper housing 4 does not leak.

Furthermore, the retainer supporting cartridge assembly 7 has additional functions in addition to a function for supporting input ramp 9. That is, as shown in FIG. 2, when retainer 30 having contact protrusions 30a protruding from one surface thereof is used, retainer 30 supports rod 9a of input ramp 9 during the assembly and contact protrusions 30a penetrate the surface of retainer fixing end 4d protruding from caliper housing 4. Therefore, it is possible to obtain a more reliable fitting force.

Figure 3:
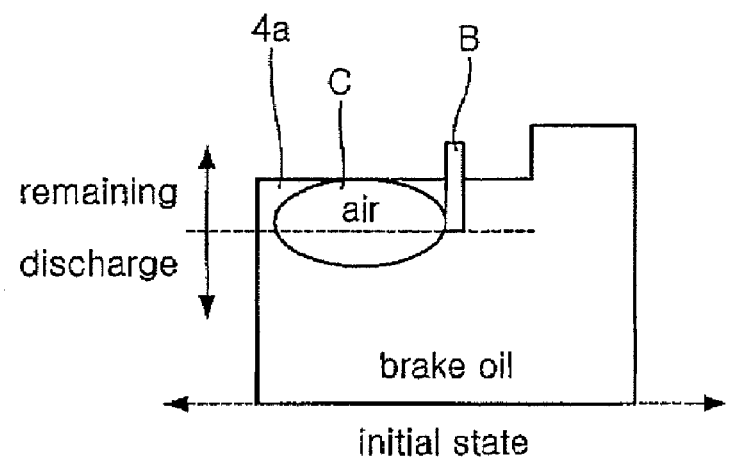
FIGS. 3A and 3B are views showing the remaining state of inner air that is caused by a protruding member provided in a caliper receiving Ball-in-Ramp.
Figure 3:
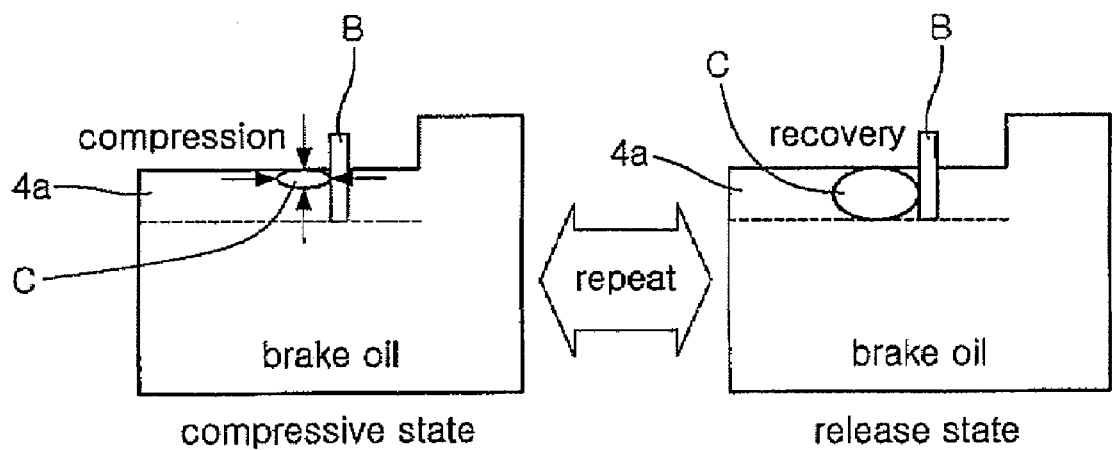

As described above, when being assembled in caliper housing 4, cartridge assembly 7 is supported by not the inner cylinder of caliper housing 4 but the outer portion of the caliper housing. Accordingly, it is possible to prevent air C from remaining in the inner cylinder of caliper housing 4 due to space occupying member B during the air exhaustion, as shown in FIG. 3, if space occupying member B is provided in liquid pressure chamber 4a and BIR chamber 4b that form the inner cylinder of caliper housing 4.

That is, when a separate space occupying member B, which supports cartridge assembly 7 assembled in liquid pressure chamber 4a and BIR chamber 4b of caliper housing 4, is provided, air C remains in liquid pressure chamber 4a and BIR chamber 4b of caliper housing 4 due to space occupying member B as shown in FIG. 3A after the air exhaustion is performed while cartridge assembly 7 is being assembled.

This phenomenon occurs in the BIR type caliper brake. When the separate space occupying member B, that is, the retainer is provided in liquid pressure chamber 4a and BIR chamber 4b of caliper housing 4, a retainer fixing groove is formed at liquid pressure chamber 4a and the retainer is fitted into the groove. Cartridge assembly 7 inserted into the caliper housing is supported by the retainer. Therefore, it is difficult to completely exhaust air after the air exhaustion. As a result, air remains in the caliper housing.

As liquid pressure is formed during the operation of the brake, the size of a bubble of air C formed in the brake oil filled in the inner cylinder of caliper housing 4 is decreased due to this phenomenon as shown in FIG. 3B. Then, as the liquid pressure is released during the non-operation of the brake, the size of the bubble of air C is increased again. This phenomenon repeatedly occurs. Therefore, driver's brake pedal operation feeling deteriorates, and difference occurs in the increase of the liquid pressure between the left and right rear wheels.

However, when a fixing member for supporting cartridge assembly 7 inserted into the inner cylinder of caliper housing 4 is provided outside caliper housing 4 like the present invention, a separate space occupying member B for supporting cartridge assembly 7 is not provided in liquid pressure chamber 4a and BIR chamber 4b of caliper housing 4. For this reason, air exhaustion of caliper housing 4 is completely performed. Therefore, air C does not remain in the brake oil filled in the inner cylinder of the caliper housing.

According to the structure where caliper housing 4 and cartridge assembly 7 are assembled and fixed outside the caliper housing like the present invention, air does not remain in caliper housing 4. Therefore, during the operation of the brake, driver's brake pedal operation feeling does not deteriorate, and difference does not occur in the increase of the liquid pressure between the left and right rear wheels.

What is claimed is:

1. A parking brake for a vehicle using an inner air exhaustion type Ball-in-Ramp brake caliper, the parking brake comprising:
   a parking unit that generates an operation force uniformly pulling a parking cable by an equalizer when a parking lever is operated;
   a caliper housing that covers both surfaces of a disk-plate provided in a wheel and includes an inner cylinder filled with brake oil and pads, the inner cylinder including a liquid pressure chamber, a BIR chamber that is formed at a front portion of the liquid pressure chamber and has a diameter smaller than that of the liquid pressure chamber, and an entrance chamber that is formed at a front portion of the BIR chamber and has a diameter smaller than that of the BIR chamber, inner surfaces of the liquid pressure chamber and the BIR chamber being free from grooves, and the entrance chamber being formed through a retainer fixing end protruding from the caliper housing;
   a cartridge assembly including balls and an output ramp, the balls being provided in grooves formed on an input ramp provided in the BIR chamber of the caliper housing, the output ramp being provided close to the liquid pressure chamber at a side opposite to the input ramp to form the grooves so that the balls are provided in the grooves, a parking operation force input unit connected to the parking cables being fixed outside the caliper housing, and the cartridge assembly changing a pulling force of the parking cable into torque and an axial force during parking braking;
   a pad wear compensator that is connected to the output ramp and is provided in the liquid pressure chamber of the caliper housing so as to press the pads against both surfaces of the disk-plate when the output ramp moves in an axial direction; and
   a retainer that is fixed to a rod of the input ramp so as to restrict free movement of the cartridge assembly assembled in the inner cylinder of the caliper housing and the pad wear compensator, the rod of the input ramp being fixed to the parking operation force input unit and protruding to the outside of the caliper housing.

2. The parking brake as defined in claim 1, wherein the retainer is fitted into a groove formed on the rod of the input ramp.

3. The parking brake as defined in claim 1, wherein the retainer includes contact protrusions protruding from one surface thereof.

* * * * *